United States Patent [19]

Newcombe

[11] 4,216,079
[45] Aug. 5, 1980

[54] EMULSION BREAKING WITH SURFACTANT RECOVERY

[75] Inventor: Jack Newcombe, Tulsa, Okla.

[73] Assignee: Cities Service Company, Tulsa, Okla.

[21] Appl. No.: 55,845

[22] Filed: Jul. 9, 1979

[51] Int. Cl.² ............................................ C10G 33/04
[52] U.S. Cl. .................................................... 208/188
[58] Field of Search ........................................ 208/188

[56] References Cited

U.S. PATENT DOCUMENTS

| 1,990,293 | 2/1935 | Lerch | 208/188 |
| 4,029,570 | 6/1977 | Coffman et al. | 208/188 |

OTHER PUBLICATIONS

Bluestein and Bluestein, "Petroleum Sulfonates," Anionic Surfactants, Part II, Surfactant Science Series, Marcel Dekker, Inc., (1976), pp. 318, 319, 335–337.

"Analysis of Petroleum Sulfonates" ASTM Designation D855-46T Issued 1945; Revised 1946, pp. 310–317.

*Primary Examiner*—George Crasanakis
*Attorney, Agent, or Firm*—Richard D. Stone

[57] ABSTRACT

A process useful for recovering surfactant and oil of low water content in surfactant flood oil recovery projects is disclosed. A produced oil in water emulsion is treated with brine and partitioning agent, preferably isopropyl alcohol, by mixing and settling to form three phases, an oil phase containing a minor amount of surfactant, a partitioning agent phase containing most of the surfactant originally present in the produced emulsion, and a brine phase containing a minor amount of alcohol.

13 Claims, No Drawings

EMULSION BREAKING WITH SURFACTANT RECOVERY

BACKGROUND OF THE INVENTION

This invention relates to the recovery of petroleum from underground reservoirs and pertains in particular to the breaking of emulsions of crude oil and water that are recovered from a producing well of the reservoir in an enhanced recovery process.

Because oil is generally in short supply, petroleum technologists have tried to extract a greater amount of the oil in place in a given reservoir. After a primary recovery has been completed, secondary recovery, or water injection, is frequently begun to displace more of the oil. Even after no more oil can be displaced from a formation by water injection there is frequently still quite a lot of oil in the ground which can be recovered by a tertiary recovery operation. Most tertiary recovery projects use surface active agents to scrub the oil out of the rocks or sands in which the oil is found, permitting displacement of the oil to producing well.

The surfactants which are added, usually petroleum sulfonates or derivatives thereof, have a built-in defect. Surface active agents which are efficient at removing petroleum from a reservoir are frequently exceedingly difficult to remove from the petroleum once it has been produced.

In most enhanced recovery processes, significant amounts of water will be produced, along with the oil, usually in the form of very stable emulsions. Breaking of emulsions produced in a tertiary recovery operation is difficult because the surfactant stabilize the emulsions. Frequently, there is not much oil present in the emulsions, from 1-30 lv% oil includes most of the emulsions to be produced, with 10-20 lv% oil being more commonly encountered as the surfactant is being produced.

The emulsions are oil-in-water, or o/w, emulsions. These emulsions are not usually encountered in petroleum production where the expected form is a water-in-oil, w/o, emulsion. Conventional emulsion breaking techniques which work on a w/o emulsion are ineffective in breaking an o/w emulsion.

Compounding the difficulties of enhanced recovery processes, the surfactants used are relatively expensive, and add greatly to the cost of such processes. The surfactants, which tend to stay in the oil phase, may cause problems in downstream processing units. To the extent that the surfactants do not end up in the crude, they are pollutants. Disposal of aqueous streams containing these surface active agents in streams and other bodies of natural water causes pollution. Most significant is the loss of a valuable material, the surfactants, which could be reused in the surfactant flood, or elsewhere.

In surfactant flooding, oil is hard to produce, hard to separate from the water used to produce it, and hard to live with in downstream processing operations. The great expense and difficulties of these processes have all acted to slow the development of surfactant recovery processes in most countries.

PRIOR ART

An excellent method of breaking an oil-in-water emulsion produced by a surfactant flood is given in U.S. Pat. No. 4,029,570 (Class 208/188), Coffman, et al., the teachings of which are incorporated by reference. Coffman contacts an emulsion with formation brine to produce a sprung oil phase and a water phase. This method will break o/w emulsions characterized by high surfactant contents; however, the produced oil phase sometimes contains unacceptable amounts of water. The '570 patent shows, in Example IV, that 100 ml of crude oil was recovered as 108 ml of sprung oil, presumably containing 8 ml, approximately, of water. The generally accepted maximum limit on water in crude is less than 1% for transmission of the crude oil by pipeline, so further treatment of the oil produced in Example IV of that patent would be needed.

Some other work has been done on breaking oil-in-water emulsions by intimate mixing with an aqueous solution of an electrolyte, e.g., sodium carbonate, and subsequent separation under the action of a high-voltage electric field. Reported in Berkman and Egloff, *Emulsions and Foams*, 1941, Page 292.

An effective emulsion breaking process is described in U.S. Ser. No. 011,335, filed Feb. 12, 1979, and assigned to a common assignee with the present application. An emulsion was broken by passing the emulsion over a fixed bed or aqueous slurry of compounds with limited soluability, which broke the emulsion. Especially preferred was the use of gypsum.

Unfortunately, none of these prior art methods provide an emulsion breaking system which would permit separate recovery of the surfactant used in the process. Many of the prior art methods suffer from various deficiencies such as producing an oil with an unacceptably high water content, or requiring the use of electrostatic precipitators to break the emulsion.

Much work has been done on purifying and concentrating surfactants as part of the surfactant manufacturing process.

The lowr alcohols, usually isopropyl alcohol, are used to extract petroleum sulfonates from oleum treated or sulfur trioxide treated mineral oils during the manufacture of white oils and petroleum sulfonates. Aqueous alcohol solutions, such as 50% isopropyl alcohol are generally used. Typical processes for manufacturing petroleum sulfonates are given in a paper presented at the American Chemical Society Marketing Symposium in New York, N.Y., Apr. 8, 1976, by E. A. Knaggs of Stepan Chemical Company, entitled "The Role of the Independent Surfactant Manufacturer in Tertiary Oil Recovery." See also Bluestein and Bluestein, Petroleum Sulfonates, Anionic Surfactants, Part II, Chapter 9, pages 318, 319, Surfactant Science Series, Marcel Dekker, Inc., 1976.

In ASTM Procedure "D855" for "Analysis of Oil-Soluble Sodium Petroleum Sulfonates," ASTM Standards for Petroleum Products, Part 18, January 1968 Edition, isopropyl alcohol is used to extract petroleum sulfonates from small amounts of oils as the first step in quantitative analysis and to determine the equivalent weight of the sulfonate.

SUMMARY OF THE INVENTION

I have now discovered an efficient way of breaking an oil-in-water emulsion produced as a result of a surfactant flood, by contacting at least a portion of the emulsion with a partitioning agent and brine.

Accordingly, the present invention provides in a process for recovering crude oil, water, and surface active agents from an oil-in-water emulsion recovered from an oil reservoir, the improvement comprising adding sufficient brine and partitioning agent to form three phases, an oil phase containing a minor amount of surface active agents, a partitioning agent phase containing the majority of the surface active agents, and a brine phase containing a minor amount of surface active agents.

In another embodiment, the present invention provides a process for recovering petroleum sulfonates from an emulsion of crude oil and water containing said sulfonates comprising reducing the water content of said emulsion to less than 10 wt.%, contacting the emulsion of reduced water content with a lower molecular weight alcohol and brine and then separating the resulting mixture into a three phase mixture of sprung oil with reduced sulfonate content, an alcohol phase containing at least 50% of the sulfonates present in the emulsion and a brine phase.

DETAILED DESCRIPTION

The emulsions which can be treated in the practice of the present invention are any oil-in-water emulsions characterized by the presence of surface active agents. These emulsions may contain 1 to 30 lv% oil with the remainder being primarily water. Surfactant concentration may range from 50 ppm to 15 wt.%, based on the amount of active petroleum sulfonate or other surface active material in the total emulsion. The upper limit on surfactant content is a very high one, and would never intentionally be encountered in the field. Such a high surfactant concentration might be seen as the result of a fracture occurring around an injection well, or somewhere in the formation, causing by-passing of the surfactant more or less directly to a producing well. When this happens, an operator will be faced with an emulsion which is extremely difficult to break. The emulsion also contains a lot of valuable petroleum sulfonate, which, if recovered, could profitably be reused.

The exact surface active agent used will be a matter of economics, the reservoir, and similar considerations. Petroleum sulfonates, alkyl sulfates, alkyl; sulfonates, alkyl-aryl sulfonates, alkylphenoxy sulfates, and sulfated alcohol ethoxyates, sulfated alkylphenoxy ethoxyates, nonionic surfactants and other surfactants that have lesser solubility in salt solutions than in fresh water can be treated by the practice of my invention.

Although I prefer the use of isopropyl alcohol as a partitioning agent, other agents such as low molecular weight alcohol such as methanol, ethanol, propanol, the preferred isopropyl alcohol, tert-butyl alcohol, sec-butyl alcohol, butyl alcohol, tert-amyl alcohol could be used, though not necessarily with equivalent results. In some situations, acetone, methyl ethyl ketone, the lower alkyl cellosolves and the lower alkyl carbitols could also be used.

In treating some emulsions, it is beneficial to give the emulsion an initial treatment which will remove the bulk of the water present. I prefer treating the as produced emulsion with oil field brine as described in U.S. Pat. No. 4,029,570. Alternatively, an electrostatic separator, or use of a gypsum bed, may in some instances provide sufficient water separation to permit the practice of the present invention.

Alcohol extraction could be used to recover sulfonate from any sulfonate containing oil. Necessary water and brine can be added.

When proper amounts of water and salt are available there is a net transfer of petroleum sulfonate into the isopropyl alcohol phase, with formation of a brine phase.

The amount of partitioning agent, e.g., isopropyl alcohol, which can be added, is set by economics and physical properties. Adding too much will form a miscible, water alcohol phase. The lower limit is variable and depends on the amount of surfactant to be recovered, though a threshold amount must be added, along with water, so some phase separation occurs.

It is not necessary to reduce the water content of the emulsion below 10% before adding isopropyl alcohol and brine. The emulsion can be handled directly without prior springing of oil with brine. The procedure of choice would depend on ecomomic evaluation.

The quantity of alcohol and brine used to recover sulfonates and essentially water-free oil depends on the concentration of sulfonate in the produced emulsion, its equivalent weight, the water solubility of the alcohol used and other factors. In the absence of alcohol, sufficient brine is added to destabilize the emulsion and to drive the sulfonate out of the aqueous phase into the oil phase. As a starting point 25 volume % of 20 wt.% brine based on the amount of oil in the emulsion is a good starting point for emulsions stabilized with 2% or more sulfonate based on the oil. Twenty-five volume % of isopropyl alcohol and 10 volume % of 20 wt.% brine should be sufficient to extract 85 wt.% or more of the sulfonate from the separated oil phase.

If the emulsion is treated directly without prior separation of the oil phase, 25 volume % isopropyl alcohol and 25 volume % of 20% brine are sufficient to drive and concentrate the surfactant in the sulfonate rich middle phase. Without sufficient brine a middle phase will not form. If too much brine is added, the surfactant and some alcohol will be driven into the oil phase. The proper range of alcohol and brine can be established by simple experiments.

Ethanol and methanol will require more concentrated brine to force the surfactant into the middle phase than isopropyl alcohol if emulsions are treated without prior separation of hydrated oil. Isobutyl alcohol, pentyl alcohol and hexyl alcohols will require less alcohol and lower brine concentrations to achieve similar results as compared to those achieved with isopropyl alcohol. IPA is preferred.

Many other materials may be present in the produced fluid. Sodium silicate, sodium hydroxide or other alkaline materials may be present as the remains of an earlier alkaline flood of the formation or from a pre-flush before the surfactant fluid was injected into the formation. Water thickeners such as polyacrylamides or biopolymers, sugars, may be present, these materials are frequently added to one or more steps of a tertiary oil recovery process for mobility control. Sometimes alcohol, such as secondary butyl alcohol, or ethers, e.g., ethylene glycol monobutyl ether, are added to the surfactant flood. There is usually quite a lot of salts present in the produced fluids. Salts are frequently added to the surfactant flood, and are almost invaribly found in the connate water in the formation.

Produced fluids can be subjected to an emulsion breaking technique which is effective for these o/w emulsions. Treatment with a formation brine is preferred, but other methods such as use of an electrostatic precipitator or coalescing bed may also be used. This treatment will reduce the water content of the sprung oil to 1 to 20 wt.%. The water will be in the form of a w/o emulsion.

EXAMPLES

A number of experiments were performed on different emulsions. Three different types of oil-external micellar fluids were used.

"69 OIL"

The average molecular weight of the sulfonate used in this oil was 421, with the following molecular weight distribution:
mw 346— —18 wt.%
mw 346-466—39 wt.%
mw 466+—43 wt. %

The crude oil was a field crude of 35° API gravity and 5.1 centipoise viscosity at 75° F.

"OIL A"

Sodium petroleum sulfonate, g/100 ml—1.127
n-Butylcellosolve, g/100 ml—0.238
Water, g—0.55
Balance crude oil to make up to 100 ml The average molecular weight of the sulfonate used in the "A Oil" was 427, with the following molecular weight distribution:
mw average 340—33.9 wt.%
mw average 422.5—23.3 wt.%
mw average 500—5.7 wt.%
mw averge 547.5—37.1 wt.%

The same crude oil used in the "69 Oil" was used in "Oil A," and in the hereafter described "oil B."

"OIL B"

Sodium petroleum sulfonate, g/100 ml—1.129
n-Butylcellosolve, g/100 ml—0.38
Water, g—0.87
Balance crude oil to make up to 100 ml The average molecular weight of the sulfonate used in the "Oil B" was 378, with the following molecular weight distribution:
mw average 340—53.9 wt.%
mw average 422.5—37.1 wt.%
mw average 500—9.0 wt.%

Oil in water emulsions were prepared by mixing 100 ml of each oil with 350 ml of deionized water for two minutes at the high speed of a Waring blender. This produced, e.g., 450 ml of an emulsion consisting of 100 ml of "69 Oil" and 350 ml of deionized water. These emulsions were stable for several days with only a small amount of creaming.

EXAMPLES 1, 2, 3

Each of these three oils was subjected to emulsion breaking with brine. The emulsions were placed in a 500 ml separatory funnel with 50 ml of formation brine. Formation brine contained 10 wt.% salts, consisting of 84.8 wt.% sodium chloride, 0.3 wt.% potassium chloride, 6.1 wt.% calcium chloride, 8.1 wt.% magnesium chloride, and 0.7 wt.% barium chloride. The glass was shaken for two minutes and then allowed to stand for 24 hours. After the first emulsion breaking step, 95 ml of the oil fraction was removed and treated again with 10 ml of fresh formation brine. This mixture was allowed to stand for 24 hours, the brine phase was removed and another 10 ml of fresh formation brine added.

All of the phases obtained were analyzed for water and sulfonate. Water in the oil phase was determined by Karl Fischer titration. Sulfonate contents of both phases were determined by a methylene blue colorimetric procedure using known molecular weight sulfonates as standards. Results of these tests are shown in Table I.

TABLE I

| Example | 1 | 2 | 3 |
|---|---|---|---|
| Micellar Fluid | 69 Oil | A Oil | B Oil |
| Sulfonate, wt.% | 1.4 | 1.334 | 0.945 |
| Oil Phase | | | |
| Volume, ml | 102 | 104 | 108 |
| Sulfonate, wt.% | 1.35 | 1.121 | 0.756 |
| Water, wt.% | 4.5 | 5.8 | 12.2 |
| Brine Phase | | | |
| Volume, ml | 398 | 396 | 392 |
| Sulfonate, wt.% by Analysis | 0.022 | 0.0128 | 0.025 |
| Sulfonate Balance | | | |
| Feed g, by Analysis | 1.20 | 1.142 | 0.811 |
| Sprung Oil, g | 1.18 | 1.077 | 0.700 |
| Brine, g | 0.09 | 0.051 | 0.099 |
| % Sulfonate in Oil | 93 | 95 | 88 |
| % Sulfonate in Brine | 7 | 5 | 12 |
| 1st Brine Treatment | | | |
| Water in Oil, wt.% | 1.4 | 0.8 | 5.3 |
| 2nd Brine Treatment | | | |
| Water in Oil, wt.% | 0.7 | 0.4 | 0.9 |
| 3rd Brine Treatment | | | |
| Water in Oil, wt.% | 0.7 | 0.4 | 0.9 |

Table I shows that for these three emulsions it was not necessary to resort to any treatment other than brine treatment, to reduce the water content of the finished oil to less than 1.0 wt.%. These experiments also showed that most of the sulfonate remained in the oil phase.

EXAMPLE 4 (Present Invention)

Recovery of petroleum sulfonate from an o/w emulsion prepared from 69 Oil was tested. An emulsion was prepared consisting of 200 ml 69 Oil and 400 ml deionized water. These components were stirred two minutes at the high speed of a Waring blender. The emulsion formed was placed in a 1 liter separatory funnel equipped with a motor driven paddle stirrer. An additional 200 ml of deionized water was added and mixed into the emulsion by stirring for five minutes. Finally, 200 ml formation brine, fortified with 10 wt.% sodium chloride, was added. The fortified formation brine contained a total of 20 wt.% salts. The emulsion broke after the addition of 25 ml of brine. Stirring was continued for 30 minutes and then the oil phase was allowed to separate by standing 24 hours. The bottom brine layer, 798 ml, was separated from the oil layer, 202 ml.

Isopropyl alcohol, 35 ml, was added to the 202 ml of oil and the mixture stirred 5 minutes. After standing for 1 hour no phase separation was observed. This indicates that merely adding IPA to this mixture did nothing. Then 25 ml of brine (formation brine plus 10 wt.% NaCl) was added and the mixture stirred for 20 minutes. After standing 10 minutes, 3 phases separated. After standing overnight the phases were separated to recover:

Top Phase, Sprung Oil: 209 ml
Middle Phase, Isopropyl Alcohol: 28 ml
Bottom Phase, Brine: 25 ml The top phase was stirred for 30 minutes with 25 ml of fortified formation brine and allowed to settle overnight. A total of 201 ml of oil was recovered that contained 0.2 wt.% water and 0.5 wt.% sulfonate.

The isopropyl alcohol phase was evaporated in a rotary vacuum evaporator to recover 3.23 g of 46.3 wt.% sulfonate. The brine phase was found to contain 0.019 wt.% sulfonate. The sulfonate balance was calculated as below:

|  | Sulfonate |
|---|---|
| Charged to Make Emulsion | 2.56 gm Sulfonate |
| Recovered in Alcohol Phase | 1.50 gm Sulfonate |
| Retained in Oil Phase | 0.85 gm Sulfonate |
| Retained in Brine Phase | 0.16 gm Sulfonate |

The recovered sulfonate is 59 wt.% of the sulfonate originally present in the emulsion.

EXAMPLES 5, 6, 7 (Present Invention)

When oils are sprung from high sulfonate content emulsions, the oil contains more sulfonate, which then allows a much higher percentage recovery of the sulfonate. This is shown in these examples for emulsions prepared from the three different oil-external micellar fluids listed below:

|  | Oil C | Oil D | Oil E |
|---|---|---|---|
| Sodium Petroleum Sulfonate, g/100 ml | 12.797 | 11.273 | 7.605 |
| n-Butylcellosolve, g/100 ml | 2.40 | 2.39 | 2.56 |
| Water, g/100 ml | 4.00 | 5.47 | 5.87 |
| Balance Crude Oil to make 100 ml |  |  |  |
| Ave. mw of Sulfonate | 421 | 427 | 378 |
| Sulfonate mw Distribution, Same as | 69 Oil | Oil A | Oil B |

Emulsions were prepared by mixing 200 ml of micellar fluid in each case with 600 ml of deionized water for 2 minutes at the high speed of a Waring blender. Emulsions were transferred to 1 liter separatory funnels equipped with a motor driven paddle stirrer. Each emulsion was broken by addition of 200 ml of fortified formation brine while stirring. Stirring was continued for 30 minutes.

After standing overnight the oil and water (1st brine) were separated. The oil layer was mixed thoroughly with 50 ml of isopropyl alcohol by motor stirring for 15 minutes. Then 50 ml of brine was added and the mixture stirred for 15 minutes and then allowed to stand. Three phases separated in less than 10 minutes. After standing 24 hours the bottom layer (2nd brine) was withdrawn. The middle layer of sulfonate dissolved in aqueous isopropyl alcohol was removed and the sulfonate recovered using a vacuum rotary evaporator. The recoverd oil layer was analyzed for water and sulfonate, the sulfonate extract for its sulfonate content, and the brines for sulfonate. The results of these experiments are shown in Table II.

TABLE II

| Example | 5 | 6 | 7 |
|---|---|---|---|
| Micellar Fluid | Oil C | Oil D | Oil E |
| Sulfonate Recovered (Alcohol Phase) |  |  |  |
| Weight, g, sulfonate, oil, and water | 40.77 | 32.32 | 24.45 |
| Purity, wt. %. 51.35 | 50.71 | 51.50 |  |
| 100% Sulfonate, g | 20.93 | 16.39 | 12.59 |
| Oil Recovered |  |  |  |
| Volume, ml | 149 | 145 | 152 |
| Sulfonate, wt.% | 0.53 | 1.708 | 0.35 |
| 100% Sulfonate, g | 0.67 | 2.10 | 0.46 |
| Water in Oil, wt.% | 0.41 | 0.72 | 0.34 |
| First Brine |  |  |  |
| Volume, ml | 772 | 790 | 780 |
| Sulfonate, wt.% | 0.05 | 0.046 | 0.0567 |
| 100% Sulfonate, g | 0.40 | 0.38 | 0.45 |
| Second Brine |  |  |  |
| Volume, ml |  | 70 | 66 | 75 |
| Sulfonate, wt.% | 0.35 | 0.26 | 0.61 |
| 100% Sulfonate, g | 0.28 | 0.19 | 0.53 |
| % Sulfonate Recovered in |  |  |  |
| Alcohol Phase | 94 | 86 | 90 |

EXAMPLE 8

As shown in Table II, the recovered oil contained from 0.34 to 0.73 wt.% water. An emulsion was prepared exactly as in Example 6 using 200 ml of Oil D micellar fluid and 600 ml of deionized water. The emulsion was broken by addition of 200 ml of fortified formation brine and allowed to separate over a 24 hour period. The oil was recovered and a small sample withdrawn for water analysis. The oil was then mixed thoroughly with 50 ml of brine and allowed to stand for 24 hours. After sampling, the oil was treated two additional times with 50 ml of brine. Results are shown below:

Sprung oil, wt.% water: 16.2
1st brine treat, wt.% water in oil: 8.9
2nd brine treat, wt.% water in oil: 7.9
3rd brine treat, wt.% water in oil: 7.8

This example shows that brine retreatment of this emulsion is not sufficient to produce low water content oil. Extraction of sulfonate is necessary to permit recovery of low water content oil.

EXAMPLE 9 (Present Invention)

Recovery of oil from a 10 volume % micellar fluid (o/w) emulsion with deionized water using formation brine to spring the oil phase and a combination of isopropyl alcohol and solid sodium chloride to recover the sulfonate and low water content oil is shown in this example.

Soluble Oil C, 100 ml, was mixed with 500 ml of deionized water at the high speed of a Waring blender for 2 minutes. This emulsion was transferred to a 1 liter separatory funnel and mixed for 15 minutes with 400 ml additional deionized water using a motor driven stirrer. The emulsion was broken by adding 150 ml of formation brine with stirring for 1 hour. Only 75 ml of brine was required to break the emulsion.

After standing for 24 hours the oil and water were separated. The oil phase was a micro w/o emulsion. An analysis follows:

| TOP, OIL PHASE |  |
|---|---|
| Volume, ml | 107 |
| Water, wt.% | 14.62 |
| Sulfonate, wt.% | 12.104 |
| Specific Gravity | 0.8931 |
| 100% Sulfonate, g | 11.57 |

| BOTTOM, BRINE |  |
|---|---|
| Volume, ml | 1040 |
| Sulfonates, wt.% | 0.105 |
| Specific Gravity | 1.016 |
| Salts, wt.% | 1.44 |
| 100% Sulfonate, g | 1.11 |

A 100 ml sample of this oil was stirred with 25 ml of deionized water and 25 ml of isopropyl alcohol and allowed to stand for 2 hours. The top oil layer was a tan macro w/o emulsion, with only a small brownish isopropyl alcohol middle layer and only 1 ml of water bottom layer. No change was observed from the first to second hour. At this time 3.75 g of solid sodium chloride was added and the mixture stirred. The sodium chloride, which is equivalent to 25 ml of 15% salt solution dissolved in about 10 minutes. Stirring was continued for 1 hour. Within 10 minutes after stirring was stopped the mixture had separated into a top micro w/o layer, a clear middle layer of tan to brown isopropyl alcohol and 28 ml estimated bottom brine layer. After standing 24 hours the layers were separated to recover:

| TOP, OIL PHASE | |
|---|---|
| Volume, ml | 61 |
| Water, wt.% | 0.41 |
| Sulfonate, wt.% | 1.105 |
| Specific Gravity | 0.8531 |
| 100% Sulfonate, g | 0.575 |

| MIDDLE, ALCOHOL LAYER | |
|---|---|
| Volume, ml | 54 |
| Sulfonate, g | 18.25 |
| Sulfonate purity, wt% | 57.89 |
| 100% Sulfonate, g | 10.565 |

| BOTTOM, BRINE | |
|---|---|
| Volume, ml | 35 |
| Sulfonate, wt.% | 0.516 |
| Specific Gravity | 1.071 |
| 100% Sulfonate, g | 0.193 |

The material balance on sodium petroleum sulfonate is shown below. The numbers differ from the above data because 107 ml sprung oil was produced by brine treatment, but only 100 ml contacted with IPA. A sulfonate balance is outlined below:

| | |
|---|---|
| Charge of Sulfonate, 12.80 gm. | |
| 1st Oil, 11.57 gm 1st brine, 1.11 gm | |
| Sulfonate Extract, 11.20 gm | |
| 2nd Oil, 0.61 gm | |
| 2nd Brine, 0.20 gm | |

Sulfonate recovery in alcohol is 87.5%, or 11.20 g recovered out of 12.80 g starting material. The overall sulfonate balance shows 103% recovery.

EXAMPLE 10 (Present Invention)

In this example surfactant made up in a water-external micellar system was emulsified with crude oil. On breaking the emulsion with brine the surfactant partitioned into the oil phase from which it was recovered by treatment with isopropyl alcohol and brine.

An emulsion was prepared by mixing 200 ml of crude oil with 400 ml of a water-external micellar fluid having the composition listed below:

| | |
|---|---|
| Sodium petroleum sulfonate, 422.5 mw | 1.842 |
| Sodium petroleum sulfonate, 340 mw | 0.680 |
| Sodium alcohol ethoxylate sulfate, 442 mw | 0.667 |
| Surfactant of 405, mw | 3.189 |
| Secondary butyl alcohol | 0.88 |
| Polyacrylamide polymer | 0.08 |
| Formation brine (10 wt.% salts) | 5.00 |
| Sodium hydrosulfite | 0.01 |
| Soft water (does not include H$_2$O in brine) | 88.11 |
| Inactive components added with surfactants, water, oil, alcohol and salts | 2.731 |
| | 100.00 |
| Specific Gravity at 25° C. | 1.0075 |

The 600 ml of emulsion was transferred to a 1 liter separatory funnel. Formation brine fortified with 10 wt.% sodium chloride was added to the emulsion with motor stirring. About 150 ml of brine was sufficient to break the emulsion, but a total of 400 ml was added. After stirring the mixture for 30 minutes it was allowed to stand for 24 hours. The system separated into three phases listed below:

| | |
|---|---|
| Top Phase | 245 ml of micro w/o |
| Middle layer | 15 ml cuff |
| Bottom layer | 740 ml brine (1st) |
| | 1000 ml |

Isopropyl alcohol, 50 ml, was added to the oil phase and cuff phase and stirred for 15 minutes. After standing 30 minutes about 15 ml of cuff had separated from the bottom. Then 50 ml of brine was added and the mixture stirred for 30 minutes. After standing for 15 minutes good separation into three phases was observed. After standing 24 hours the phases were separated as shown below:

Top phase: 205 ml of micro oil
Middle phase: 71 ml of aqueous isopropyl alcohol surfactant solution
Bottom: 83 ml brine The aqueous isopropyl alcohol extract was evaporated from the middle phase in a rotary vacuum evaporator to recover 19.71 g of surfactant which was 51.13 wt.% active component.

Water in the oil layer was determined to be 0.32 wt.% by Karl Fisher titration. Active surfactant in the oil phase was found to be 0.218 wt.%.

Surfactant content in the first brine was determined as 0.01215%, and in the second brine as 0.359 wt.%.

The surfactant balance was calculated to be as follows:

| | |
|---|---|
| Charge to emulsion | 12.85 g |
| Recovered from isopropyl alcohol extract | 10.08 g |
| Surfactant in oil | 0.38 g |
| Surfactant in 1st brine | 0.10 g |
| Surfactant in 2nd brine | 0.34 g |
| Total recovered | 10.90 |

$$\text{Sulfonate recovered based on charge} = \frac{10.08}{12.85} (100) = 78\%$$

$$\text{Sulfonate recovered based on analysis} = \frac{10.08}{10.9} (100) = 92\%$$

From these examples, it can be seen that emulsion breaking techniques which work on o/w emulsions do not necessarily produce an oil with a water content low enough to permit pipeline transmission of the oil. Conventional emulsion breaking techniques, e.g., treating with brine, leave the sprung oil containing significant amounts of petroleum sulfonates. This represents both a source of contamination for downstream processing units and a loss of a valuable material, the petroleum sulfonate.

Using the practice of my invention, surface active agents used in a surfactant flood can be recovered for reuse in the project. The partitioning agent, preferably isopropyl alcohol, can be recovered for reuse in the process by simple evaporation, distillation, or other conventional means. The presence of the partitioning agent in the surfactant flood is not harmful, and frequently may be beneficial, so a very rigorous separation of partitioning agent from surfactant is not necessary.

EXAMPLE 11

An emulsion was prepared by mixing 100 ml of soluble oil "C" and 500 ml of deionized water at the high speed of a Waring blender for 2 minutes. This emulsion was stable for several weeks with only a small amount of creaming. When broken by adding 150 ml of formation brine fortified with 10 wt.% sodium chloride (20 wt.% salt total), 110 ml of micro w/o emulsion was recovered which contained 15.0 wt.% water and 10.5 wt.% surface active agents.

EXAMPLE 12 (Present Invention)

An alternate batch of 600 ml of emulsion was prepared as in Example 11. This emulsion was treated with 150 ml of formation brine containing 10 wt.% added sodium chloride (20 wt.% salt) and 50 ml of isopropyl alcohol in a 1 liter separatory funnel by mixing thoroughly for 10 minutes using a motor driven stirrer. The mixture was allowed to settle. Separation into three phases occurred within a few minutes. After standing 24 hours, the phases were separated to recover:

Top Phase, Oil
  74 ml containing 0.35 wt.% water and 0.62 grams of sulfonate.
Middle Phase, Aqueous Isopropyl Alcohol
  105 ml containing 11.30 grams of sulfonate.
  Recovery 88%.
Bottom Phase, Aqueous Brine
  621 ml containing 0.68 grams of sulfonate.

From these examples, it can be seen that merely adding brine alone, as in Examples 1, 2 and 3, will not recover surface active agents from an emulsion of oil, water and surface active agents. The addition of brine may break the emulsion, but, as shown in Examples 8 and 11, the produced oil may have a high water content.

Merely adding a partitioning agent to an emulsion may not result in any phase separation at all, as shown in one step of Example 4.

Adding a partitioning agent and brine, as shown in those examples labelled "Present Invention," will effectively dehydrate the oil and recover surface active agents. The brine can be separately added, or may be brine which is left in the emulsion.

I claim:

1. In a process for recovering crude oil, water, and surface active agents from an oil-in-water emulsion recovered from an oil reservoir, the improvement comprising
  adding sufficient brine and partitioning agent to form three phases, an oil phase containing a minor amount of said surface active agents, a partitioning agent phase containing the majority of said surface active agents, and a brine phase containing a minor amount of said surface active agents.

2. Process of claim 1 wherein said surface active agents are non-ionic or anionic.

3. Process of claim 1 wherein said surface active agents are petroleum sulfonate.

4. Process of claim 3 wherein the petroleum sulfonate has a molecular weight of 350 to 500.

5. Process of claim 1 wherein the partitioning agent is selected from the group of lower molecular weight alcohols, acetone, methyl ethyl ketone, the lower alkyl cellosolves and the lower alkyl carbitols.

6. Process of claim 1 wherein the partitioning agent is selected from the group of methanol, ethanol, propanol, isopropyl alcohol, tert-butyl alcohol, sec-butyl alcohol, butyl alcohol, tert-amyl alcohol, and hexyl alcohol.

7. Process of claim 1 wherein the partitioning agent is isopropyl alcohol.

8. Process of claim 1 wherein the volume ratio of partitioning agent to emulsion is 0.01:1 to 1:1.

9. Process of claim 1 wherein the volume ratio of brine to emulsion is 0.01:1 to 1:1.

10. Process of claim 1 wherein the volume ratio of partitioning agent to emulsion is 0.02:1 to 0.5:1, and the volume ratio of brine to emulsion in is 0.05:1 to 0.5:1.

11. A process for recovering petroleum sulfonates from an emulsion of crude oil and water containing said sulfonates comprising
  a. reducing the water content of said emulsion to less than 10 wt.%
  b. contacting the emulsion from step a with a lower molecular weight alcohol and brine
  c. separating the product of Step b into three phases comprising sprung oil with reduced sulfonate content, an alcohol phase containing at least 50% of the sulfonates present in said emulsion and a brine phase.

12. Process of claim 11 wherein the alcohol is isopropyl alcohol.

13. Process of claim 10 wherein the volume ratio of alcohol to brine is 1:4 to 4:1, and the volume ratio of alcohol to emulsion is 0.02:1 to 1:1.

* * * * *